(12) United States Patent
Teramoto et al.

(10) Patent No.: US 9,103,464 B2
(45) Date of Patent: Aug. 11, 2015

(54) HOLDING CIRCUIT, ELECTROMAGNETIC VALVE, VALVE SELECTOR, AND FLOW CONTROLLER

(75) Inventors: Youichi Teramoto, Omuta (JP); Kazuhira Sakamoto, Omuta (JP); Toshikazu Kawaguchi, Sapporo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/885,521

(22) PCT Filed: Jun. 10, 2011

(86) PCT No.: PCT/JP2011/063402
§ 371 (c)(1),
(2), (4) Date: May 15, 2013

(87) PCT Pub. No.: WO2012/066814
PCT Pub. Date: May 24, 2012

(65) Prior Publication Data
US 2013/0240766 A1    Sep. 19, 2013

(30) Foreign Application Priority Data
Nov. 16, 2010  (JP) .................. 2010-255679

(51) Int. Cl.
*H01H 47/22*    (2006.01)
*F16K 31/06*    (2006.01)
(Continued)

(52) U.S. Cl.
CPC ............ *F16K 31/0675* (2013.01); *H01F 7/064* (2013.01); *H01F 7/1838* (2013.01)

(58) Field of Classification Search
USPC .................................................. 361/160, 159
See application file for complete search history.

(56) References Cited

U.S. PATENT DOCUMENTS 4,001,520 A * 1/1977 Waldman et al. ............. 379/442
4,125,885 A * 11/1978 Lowther et al. ............... 361/114
4,782,242 A * 11/1988 Kovacs .......................... 307/106
(Continued)

FOREIGN PATENT DOCUMENTS

JP    49-78225    7/1974
JP    56-46218    4/1981
(Continued)

OTHER PUBLICATIONS

International Search Report filed in PCT/JP2011/063402 dated Sep. 1, 2011.

*Primary Examiner* — Thienvu Tran
*Assistant Examiner* — Angela Brooks
(74) *Attorney, Agent, or Firm* — Rankin, Hill & Clark LLP (57) ABSTRACT

Relating to a solenoid used as a solenoid valve, a holding circuit and the like for suppressing the occurrence of back electromotive force, and preventing magnetic flux density from deterioration, without a major change of the conventional circuit constitution, is provided. A capacitor is connected in parallel with a resistance which is connected in series to a solenoid. The solenoid is driven at rated voltage by making a first switch and a second switch ON state and the solenoid is kept at holding voltage by making the first switch OFF state. The capacitor slows down the speed of change of applied voltage to the solenoid from the rated voltage to the holding voltage so that the back electromotive force of the solenoid is absorbed, which prevents the extinguishment of magnetic flux density.

6 Claims, 9 Drawing Sheets

(51) Int. Cl.
*H01F 7/06* (2006.01)
*H01F 7/18* (2006.01)

(56) References Cited

U.S. PATENT DOCUMENTS

| | | | | |
|---|---|---|---|---|
| 4,788,025 | A | * | 11/1988 | Oyabu et al. ............ 376/143 |
| 8,130,482 | B2 | * | 3/2012 | Yang ...................... 361/209 |
| 2009/0316324 | A1 | * | 12/2009 | Scripca et al. ........... 361/160 |
| 2010/0309600 | A1 | * | 12/2010 | Brutschin et al. ........ 361/160 |
| 2011/0019328 | A1 | * | 1/2011 | Morimoto ............... 361/160 |
| 2013/0089467 | A1 | * | 4/2013 | Teramoto et al. ......... 422/69 |

FOREIGN PATENT DOCUMENTS

| | | |
|---|---|---|
| JP | 57-137879 | 8/1982 |
| JP | 03-061776 | 3/1991 |
| JP | 03-277884 | 12/1991 |
| JP | 04-36206 | 3/1992 |

* cited by examiner

HOLDING CIRCUIT, ELECTROMAGNETIC VALVE, VALVE SELECTOR, AND FLOW CONTROLLER

TECHNICAL FIELD

The present invention relates to a holding circuit, a solenoid valve, a valve selector and a flow controller, and particularly relates to heat generation saving and electric power saving utilizing a holding circuit and the like comprising a solenoid which is driven at a rated voltage and its drive state is held at a holding voltage lower than the rated voltage.

BACKGROUND ART

Figure 8:
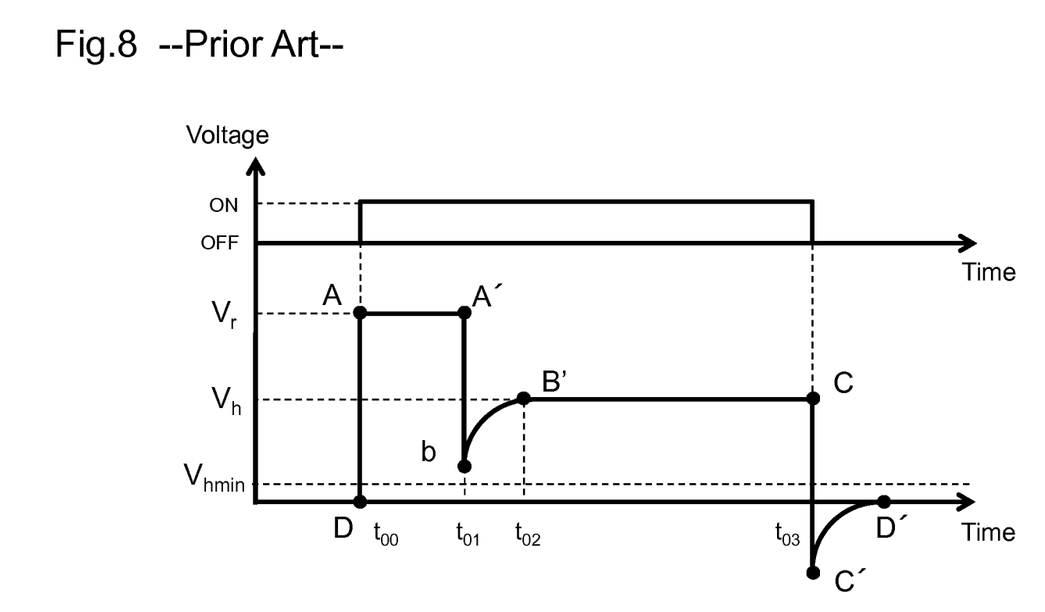
FIG. 8 shows a diagram which illustrates the temporal change of voltage in the holding circuit of FIG. 7.
Figure 9:
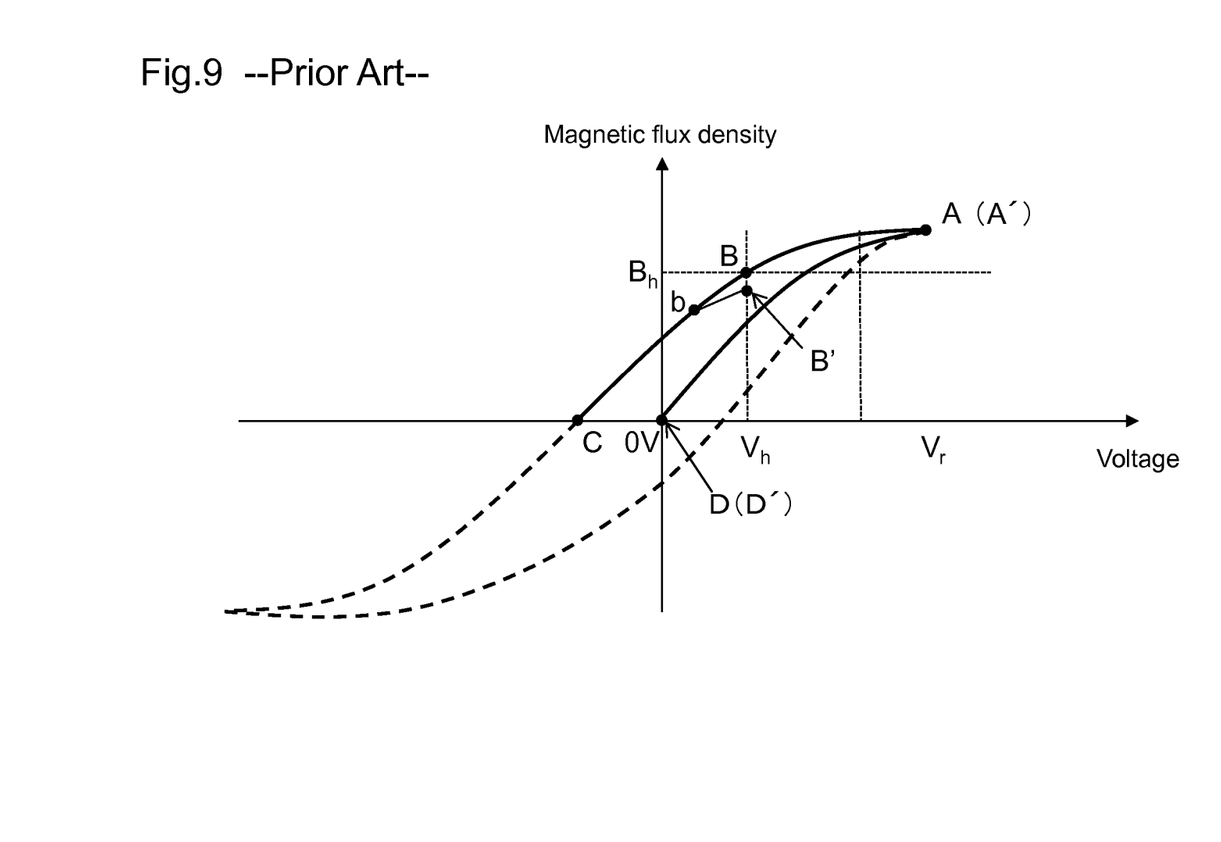
FIG. 9 shows a diagram which illustrates the relation between the applied voltage and the magnetic flux density of the solenoid in the holding circuit of FIG. 7.

In general, heat generation of a solenoid valve is unfavorable. Thus, much effort has been spent for heat generation saving and electric power saving of solenoid valves so far. For example, a conventional holding circuit 51 shown in FIG. 7 reduces rated voltage to holding voltage by connecting a resistance 59 to a solenoid 53 in series. FIG. 8 illustrates the temporal change of voltage at the solenoid 53 in FIG. 7. FIG. 9 illustrates the relation between applied voltage and magnetic flux density at the solenoid 53.

SUMMARY OF INVENTION

Technical Problem

When a solenoid which includes inductance faces a rapid change of current, it causes large back electromotive force based on self-induced effect as a transient phenomenon. The magnitude of the back electromotive force is proportional to the speed of current change.

As shown in A'-b-B' curve in FIG. 8, the conventional holding circuit 51 is at risk for depression of applied voltage at the solenoid under $V_{hmin}$ (minimum holding voltage) which is the voltage necessary for the solenoid to keep the function of a solenoid valve because of back electromotive force caused at the current change of the applied voltage of the solenoid from rated voltage $V_r$ to holding voltage $V_h$. Thus, the holding voltage $V_h$ is set at a high value such that the applied voltage cannot be reduced under the minimum holding voltage even if the applied voltage is transiently depressed based on back electromotive force.

However, the high holding voltage has prevented sufficient heat generation saving and electric power saving of the solenoid valve. Further, the insufficient heat generation results in, for example, short energization of a solenoid valve so that antibody transported in solution is kept from extinction by the heat generation from the solenoid valve in a valve selector or a flow controller. As this, because a solenoid valve cannot be energized continuously, the application of a valve selector or a flow controller has been limited.

Further, as shown in FIG. 9, the magnetic flux density is reduced to point b because of back electromotive force at the solenoid 53. Then, the magnetic flux density increases back toward point B as the applied voltage recovers to holding voltage $V_h$. However, the magnetic flux density recovers only to point B'. As this, the whole of the lost magnetic flux density cannot be recovered and the holding force of the solenoid valve is deteriorated.

It is, therefore, an object of the present invention to provide a holding circuit and the like for suppressing the occurrence of back electromotive force, and preventing magnetic flux density from deterioration, without a major change of the conventional circuit constitution.

Solution to Problem

The first aspect of the present invention is a holding circuit comprising a solenoid and a resistance which are serially connected, wherein the solenoid is driven at a rated voltage and its drive state is held at a holding voltage lower than the rated voltage, a first switching unit that is connected in series with the solenoid and the resistance, and configured to switch between a state where the solenoid is driven and the state where the solenoid is not driven, a second switching unit that is connected in parallel with the resistance, and configured to switch from an ON state to an OFF state after a predetermined interval after the solenoid is driven at the rated voltage by the first switching unit, and a capacitor that is connected in parallel with the resistance, and configured to have a larger time constant than that of the solenoid and to absorb back electromotive force at the solenoid by slowing down the change of voltage applied to the solenoid from the rated voltage to the holding voltage after the second switching unit is switched to the OFF state.

The second aspect of the present invention is the holding circuit of the first aspect, wherein capacity C of the capacitor, equivalent resistance component $r_C$ of the capacitor, equivalent resistance component $r_L$ of the solenoid, and inductance L of the solenoid satisfy a following equation (1).

The third aspect of the present invention is the holding circuit of the second aspect, wherein the second switching unit is a second capacitor which is a capacitor connected in parallel with the capacitor, and capacity of the second capacitor $C_2$ is larger than the capacity C of the capacitor.

The fourth aspect of the present invention is the holding circuit of the third aspect, wherein the first switching unit is a contactor configured to have three contacts of a first contact, a second contact and a third contact, the first contact is connected to the second capacitor, the second contact is connected to a power source which applies the rated voltage, the third contact is connected to the solenoid, the contactor is configured to start to charge the second capacitor by connecting the first contact and the second contact, the contactor is configured to form a closed circuit including the second capacitor and the solenoid and not including the power source by connecting the first contact and the third contact, and a discharge resistance other than the resistance is connected between the third contact and the solenoid in the closed circuit.

The fifth aspect of the present invention is the holding circuit of the fourth aspect, further comprising a diode for letting current to flow in a direction opposite to a direction in which the power source applies voltage, wherein the diode is connected in series with the discharge resistance and in parallel with the solenoid, and resistance value of the discharge resistance is smaller than that of the resistance.

The sixth aspect of the present invention is a solenoid valve controlled by any one of the holding circuit of the first aspect through the fifth aspect.

The seventh aspect of the present invention is a valve selector comprising the solenoid valve of the sixth aspect.

The eighth aspect of the present invention is a flow controller comprising the solenoid valve of the sixth aspect or the valve selector of the seventh aspect.

[Equation 1]

$$C \geq \frac{L}{r_C r_L} \quad (1)$$

Advantageous Effects of Invention

According to each aspect of the present invention, the capacitor in parallel with the resistance absorbs the back electromotive force occurring at the solenoid and reduces the voltage applied to the solenoid from the rated voltage to the holding voltage smoothly. Thus, it is possible to ensure the voltage applied to the solenoid higher than the minimum holding voltage and to lower the holding voltage even to the minimum holding voltage. Besides, because the occurring of the back electromotive force is suppressed, the magnetic flux density is reduced only to the point where the function of the solenoid valve can be kept stably and no extinguishment of magnetic flux density occurs.

Here, as described in Patent Literature 1 or 2, for example, a circuit simply comprising a diode in parallel with a solenoid, and a capacitor in parallel with a resistance is known.

However, in Patent Literature 1, the capacitor C1 is for realizing timer function. The capacitor C2 is, as described in the description of Patent Literature 1, for preventing anomalous oscillation and protecting a transistor Q1. Thus, a capacitor of small capacity about 1 μF or smaller is usually used for the capacitor C2. As this, the capacities of the capacitors C1 and C2 are determined indifferently of the inductance of the solenoid. On the contrary, the capacitor of the present invention plays a different role in the circuit from those in Patent Literature 1. The capacity of the capacitor of the present invention is determined in relation with the solenoid and the resistance because the capacitor is to absorb large transient back electromotive force which occurs at the solenoid.

In addition, the purpose of the technology described in Patent Literature 2, is to speed up behaviors, that is, to bring the curves a and b close to the curve c in FIG. 3 in Patent Literature 2. This purpose has nothing to do with the solution for the purpose of the present invention that the back electromotive force at the solenoid should be suppressed.

In FIG. 3 of Patent Literature 2, there seems no back electromotive force occurring in the curve c. However, this results from the diode connected in parallel with the solenoid. The capacitor described in Patent Literature 2 is to control a transistor as a delay circuit, like the capacitor C1 in Patent Literature 1. Thus, the capacitor in Patent Literature 2 is not for controlling the applied voltage at the solenoid. The capacitor in Patent Literature 2 also plays a different role in the circuit from that of the capacitor of the present invention.

According to each of the aspects of the present invention, it is possible to suppress the back electromotive force without major change of circuit constitution.

In addition, according to the second aspect of the present invention, the capacity of the capacitor for suppressing the back electromotive force of the solenoid can be determined based on equation (1).

Further, according to the third aspect of the present invention, the second capacitor whose capacity is larger than that of the capacitor is used as the second switching unit. Thus, there is enough time for driving the solenoid valve and timer function can be realized without a timer circuit. Therefore, compared with the circuit which needs a timer circuit, it is even easier to reduce the circuit size, failure probability and production cost of the holding circuit.

Further, according to the fourth aspect of the present invention, a closed circuit including the second capacitor and the solenoid is formed when the solenoid is disconnected from the power source. Thus, as well as when reducing the voltage from the rated voltage to the holding voltage, when the solenoid is disconnected from the power source, the back electromotive force occurring at the solenoid can be absorbed.

Here, if the first contact and the second contact is connected in order to drive the solenoid again before the capacitor and the second capacitor are completely discharged, the second capacitor cannot play a role of the second switching unit. Thus, it is important that the capacitor and the second capacitor are rapidly discharged when the power source is disconnected.

Then, according to the fourth aspect of the present invention, not only the closed circuit including the second capacitor and the resistance but also a closed circuit including the second capacitor and the solenoid is formed when the contactor stops applying voltage from the power source. Therefore, it is easier to discharge the second capacitor rapidly.

Further, according to the fifth aspect of the present invention, the resistance value of the discharge resistance connected to the second contact is smaller than that of the resistance connected to the first contact. Besides, the diode let as much current as possible bypass the solenoid when discharging. Thus, it is even easier to discharge the charge stored in the capacitor and the second capacitor rapidly.

Further, according to the sixth aspect of the present invention, the solenoid valve whose holding voltage is lower than a conventional one can be realized. Additionally, according to the seventh and eighth aspects of the present invention, a valve selector and a flow controller utilizing such a solenoid valve can be realized, respectively. Thus, by reducing the heat generation from a solenoid valve, a valve selector or a flow controller can be realized, which has a solenoid valve to which long time energizing is possible and with which transported solution is less heated. Therefore, such a valve selector or a flow controller can be utilized for more applications. It is possible, for example, to transport solution vulnerable to heat reducing the damage to the solution, such as solution including antibody.

CITATION LIST

Patent Literature

[Patent Literature 1]: JP 1991-277884 A1.
[Patent Literature 2]: JP 1974-078225 A1.

EXAMPLES

In the following, the embodiments of the present invention will be described, referring to figures. The embodiments of the present invention are not limited to the embodiments exemplified below.

Example 1

Figure 1:
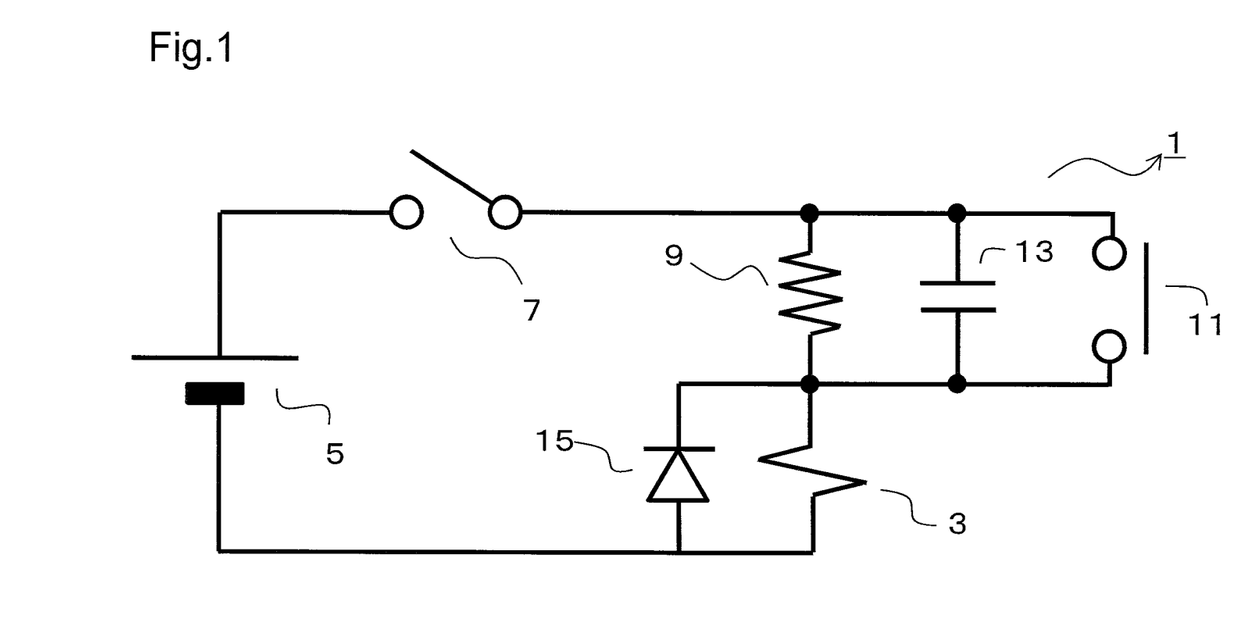
FIG. 1 shows a circuit diagram of the holding circuit in accordance with an embodiment of the present invention.
Figure 2:
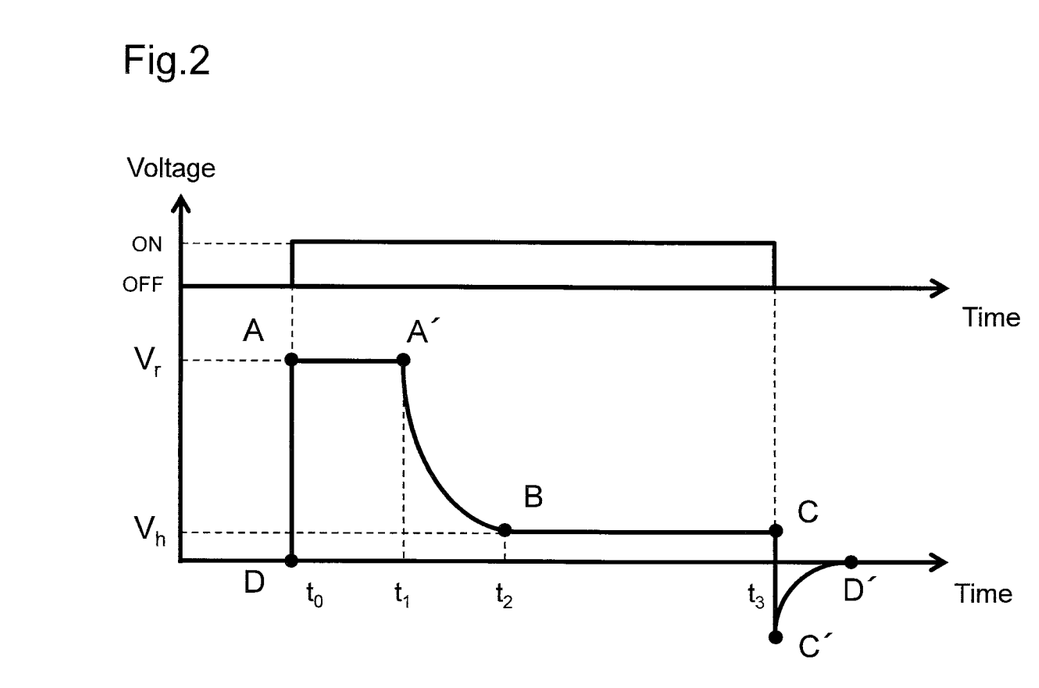
FIG. 2 shows a diagram which illustrates the temporal change of voltage in the holding circuit of FIG. 1.

FIG. 1 shows a circuit diagram of the holding circuit 1 in accordance with an embodiment of the present invention. FIG. 2 shows a diagram which illustrates the temporal change of voltage in the holding circuit 1 of FIG. 1.

In general, a flow controller for transporting solution has a valve selector for transporting several kinds of solutions without mixing them. In the valve selector, solenoid valves are commonly used for opening or closing the gate to tubes through which the solutions flow. The solenoid 3 in the holding circuit 1 in FIG. 1 is used as a solenoid valve, for example. To the solenoid used as a solenoid valve, rated voltage is applied in order to drive the valve and holding voltage smaller than the rated voltage is applied in order to hold the switching condition of the solenoid valve. The temperature of the solenoid of 1 W power consumption increases to as high as 80 degrees Celsius after one and half a minute energization at the rated voltage. If such a solenoid valve is used in a flow controller for transporting solution including antibody, the valve selector is heated to a high degree by heat generation from the solenoid valve and the antibody to be transported may be at the risk of destruction. The heat generation from a solenoid valve is generally unfavorable and may cause different trouble other than heat up of a valve selector. Thus, a holding circuit for reducing the applied voltage to the solenoid has been developed. However, the back electromotive force occurring at the solenoid has prevented the reduction of applied voltage.

As for the holding circuit 1 in FIG. 1, connected in series to the solenoid 3 (an example of "solenoid" in Claims) are a DC power source 5 (an example of "power source" in Claims) whose source voltage is V and which supplies direct current, a first switch 7 (an example of "first switching unit" in Claims) which switches between a state where current flows through the solenoid 3 and a state where current does not flow through the solenoid 3 by switching between a conduction state (an example of "ON state" in Claims) and a non-conduction state (an example of "OFF state" in Claims), and a resistance 9 (an example of "resistance" in Claims). Connected in parallel with the resistance 9 are a second switch 11 (an example of "second switching unit" in Claims) and a capacitor 13 (an example of "capacitor" in Claims). The second switch 11 changes from the conductance state (ON) to the non-conductance state (OFF) a certain period of time after the first switch 7 becomes the conductance state (ON state). The capacitor 13 absorbs the back electromotive force at the solenoid 3 by slowing down the speed of the applied voltage to the solenoid 3 changing from rated voltage to holding voltage. A diode 15 is connected in parallel with the solenoid 3.

Here, the diode 15 is for protecting the first switch 7 and the second switch 11 from failure caused by the back electromotive force of the solenoid 3. But the holding circuit 1 works without the diode 15.

Figure 7:
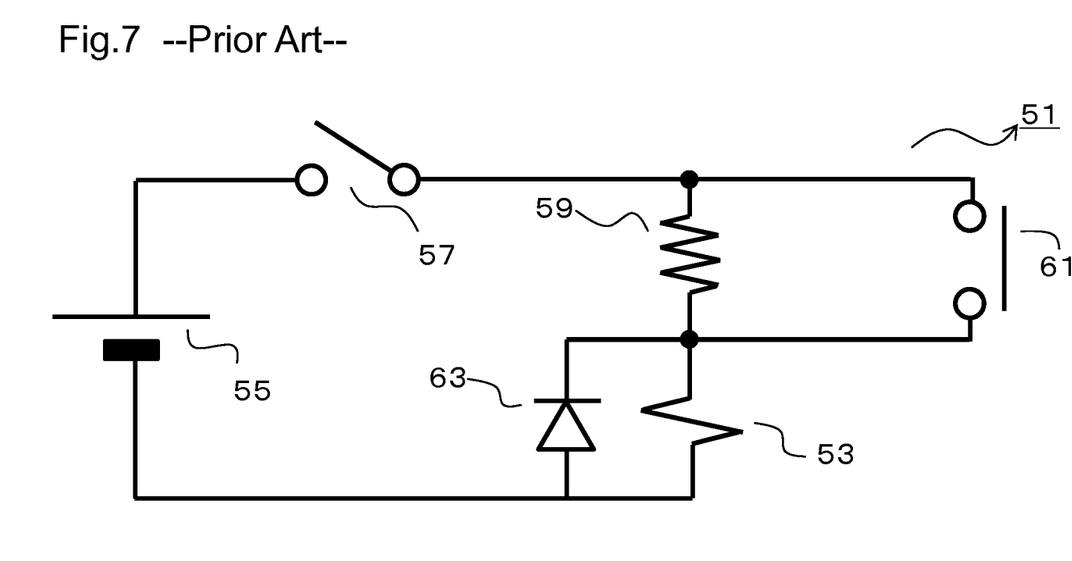
FIG. 7 shows a circuit diagram of a conventional holding circuit.

Before describing the behavior of the capacitor 13 in FIG. 1 in detail, the behavior of the conventional holding circuit 15 in FIG. 7 without the capacitor 13 is explained in detail. In the holding circuit 51 in FIG. 7, a solenoid 53, a DC power source 55, a first switch 57, a resistance 59, a second switch 61 and a diode 63 are corresponding with the solenoid 3, the DC power source 5, the first switch 7, the resistance 9, the second switch 11 and the diode 15 in FIG. 1, respectively.

Referring to FIGS. 8 and 9, the behavior of the conventional holding circuit 51 of FIG. 7 is described in detail. FIG. 8 shows a diagram which illustrates the temporal change of voltage of the holding circuit 51. The horizontal axis shows elapsed time and the vertical axis shows the amplitude of voltage. FIG. 9 shows a diagram which illustrates the relation between applied voltage and magnetic flux density of the solenoid 53 of the holding circuit 51.

Referring to FIG. 8, the second switch 61 is ON state when the first switch 57 becomes ON state at time point $t_{00}$ (point D), and all the voltage of the DC power source 55 is applied to the solenoid 53. At this point, rated voltage $V_r$ is applied to the solenoid 53 and the solenoid 53 is driven as a solenoid valve (point A). At time point $t_{01}$, the second switch 61 becomes OFF state by timer function (point A'), and the source voltage V is applied to the resistance 59, too. At this time, back electromotive force occurs at the solenoid 53 based on the rapid reduction of current through the solenoid 53. As a result, the applied voltage to the solenoid 53 becomes much lower than the holding voltage $V_h$ (point b). After a while, at time point $t_n$, the voltage recovers up to the holding voltage $V_h$ (point B'). At time point $t_{03}$, when the first switch becomes OFF state (point C), back electromotive force occurs again at the solenoid 33 (point C') and the applied voltage to the solenoid reduces to zero (point D').

FIG. 9 shows a diagram which illustrates the change of magnetic flux density of the solenoid 53 in this drive cycle. After the solenoid 53 is excited by applying rated voltage (point A(A')), the second switch 61 becomes OFF. Ideally, the magnetic flux density should stay at the point B where the solenoid 53 can play a stable role of a solenoid valve. However, the magnetic flux density once reduces as low as point b because of back electromotive force occurred at the solenoid 53. Then, the magnetic flux density recovers toward the point B along with the recovery of voltage to $V_h$. However, the magnetic flux density cannot reach the point B and stops at the point B'. That is, the disappeared magnetic flux density does not wholly recover.

As this, in the conventional holding circuit 51 in FIG. 7, as shown in the curve A'-b-B' in FIG. 8, the back electromotive force occurs at the solenoid 53 when the second switch 61 becomes OFF state. And, as shown in FIG. 9, the disappeared magnetic flux density cannot wholly recover, resulting in lower holding force of the solenoid valve.

Next, as for the holding circuit 1 in FIG. 1 in accordance with an embodiment of the present invention, the capacitor 13 is mainly described, which is a major feature of the holding circuit 1.

The capacitor 13 is not charged at all when the first switch 7 and the second switch 11 are conduction state. At the time point when the second switch 11 becomes OFF, the capacitor 13 begins to be charged without resistance, and when the capacitor 13 is fully charged, the resistance of the capacitor 13 becomes infinite. That is, the capacitor 13 can be regarded as a variable resistance whose resistance value increases gradually from zero to infinite. The capacitor 13 slows down the speed of change of applied voltage to the solenoid 3 from rated voltage to holding voltage and absorbs back electromotive force at the solenoid 3.

The capacitor 13 needs the capacity corresponding to the inductance of the solenoid 3, in order to absorb huge back electromotive force at the solenoid 3. The current $I_L$ caused by the back electromotive force of the solenoid 3 is expressed by equation (2). Here, $T_L$ denotes time constant of the solenoid 3, and $T_L$ is expressed by equation (3), using a constant $I_0$, the inductance L of the solenoid 3 and the equivalent resistance component $r_L$ inherent in the solenoid 3.

In addition, the current absorbed by the capacitor 13 is expressed by equation (4). Here, $T_C$ denotes time constant of the capacitor 13 and $T_C$ is expressed by equation (5), using a constant the capacity C of the capacitor 13 and the equivalent resistance component $r_C$ inherent in the capacitor 13.

[Equation 2]

$$I_L = I_0 \cdot \exp\left(-\frac{t}{T_L}\right) \quad (2)$$

$$T_L = \frac{L}{r_L} \quad (3)$$

$$I_C = I_1 \cdot \exp\left(-\frac{t}{T_C}\right) \quad (4)$$

$$T_C = r_C \cdot C \quad (5)$$

In order that the capacitor 13 absorbs the back electromotive force of the solenoid 3, it is necessary that the time constant $T_C$ of the capacitor 13 is larger than the time constant $T_L$ of the solenoid 3. That is, it is necessary to satisfy equation (6). From equations (3), (5) and (6), equation (7) holds. When equation (7) is deformed as for C, equation (8) holds.

[Equation 3]

$$T_C \geq T_L \quad (6)$$

$$r_C \cdot C \geq \frac{L}{r_L} \quad (7)$$

$$C \geq \frac{L}{r_C r_L} \quad (8)$$

Practically, in order to determine the capacity of the capacitor 13, it is favorable, for example, to prepare a capacitor with the capacity corresponding to the inductance obtained by measuring, using a tester or the like, the inductance, equivalent resistance component $r_0$, equivalent resistance component $r_L$ and so on of the solenoid 3 to be used.

Figure 3:
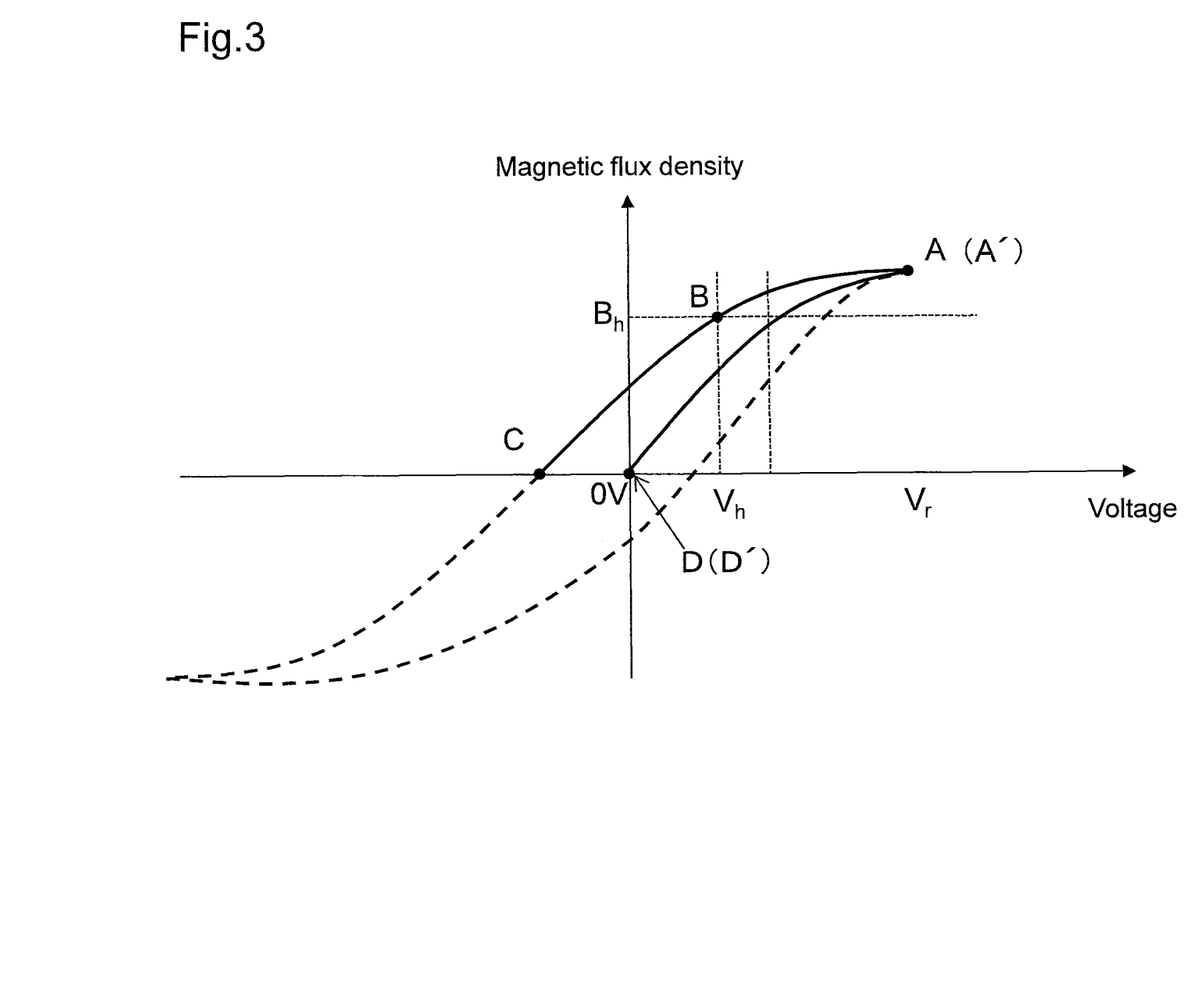
FIG. 3 shows a diagram which illustrates the relation between the applied voltage and the magnetic flux density of the solenoid in the holding circuit of FIG. 1.

Below, referring to FIGS. 2 and 3, the behavior and so on of the capacitor 13 is described, focusing on the difference from the behavior of the holding circuit 51 in FIG. 7. The upper diagram in FIG. 2 illustrates temporal change of ON/OFF of the first switching unit 7. The lower diagram in FIG. 2 illustrates the applied voltage to the solenoid 3. The horizontal axis shows elapsed time and the vertical axis shows the magnitude of voltage. FIG. 3 shows a diagram which illustrates the relation between applied voltage and magnetic flux density of the solenoid in the holding circuit in FIG. 1.

<Driving Solenoid Valve>

Referring to FIG. 2, the second switch 11 is ON state when the first switch 7 becomes ON state at time point $t_0$ (point D) when the solenoid valve is driven, and all the voltage V of the DC power source is applied to the solenoid 3. At this point, rated voltage $V_r$ is applied to the solenoid 3 and the solenoid 3 is driven as a solenoid valve (point A).

<Holding Solenoid Valve>

At time point $t_1$, the second switch 11 becomes OFF state by timer function (point A'), and the source voltage V is applied to the resistance 9, too. Then, the holding voltage is lower than the rated voltage. The behavior while the applied voltage to the solenoid 3 is reduced from the rated voltage to the holding voltage is described.

When the second switch 11 becomes OFF by the timer function, the capacitor 13 starts to be charged because voltage is applied to the resistance 9 and the capacitor 13, too. While the capacitor 13 is charged, the resistance value of the capacitor against the current increases gently. Accordingly, the applied voltage components to the resistance 9 and the capacitor which are connected in parallel increases gently. On the contrary, the applied voltage component to the solenoid 3 decreases gently, resulting in the gentle reduction of the current.

Generally speaking, the back electromotive force which can occur at the solenoid 3 is huge. However, the capacity of the capacitor 13 is determined based on equation (8), which is enough to absorb the back electromotive force of the solenoid 3.

As a result, the back electromotive force is suppressed and the applied voltage to the solenoid 3 reduces slowly during time point $t_1$ and time point $t_2$, from A' to B. Thus, in the holding circuit 1, it is possible to lower the holding voltage $V_h$, making it easier to save the heat generation from the solenoid valve and save electric power. It is also possible to lower the holding voltage $V_h$ as low as the minimum holding voltage.

FIG. 3 shows a diagram which illustrates the change of magnetic flux density in the driving cycle of the solenoid 3 using the holding circuit 1. After the solenoid 3 is excited by applying rated voltage (point A(A')), the second switch 11 becomes OFF. As for the holding circuit 1, because the occurrence of the back electromotive force at the solenoid 3 is suppressed, the magnetic flux density does not decrease under the point B where the solenoid 3 can play a stable role of a solenoid valve. Thus, as for the holding circuit 1, magnetic flux density does not disappear.

For comparison between the holding circuit 1 and the holding circuit 51, a test was conducted whether the solenoid 53 can keep the function as a solenoid valve or not when the resistance 59 is varied, using 24V DC power source as an example of the DC power source 55 in FIG. 7, a solenoid "STV-2-M6KG DC24V" made by TAKASAGO ELECTRIC, INC., as an example of the solenoid 53. As a result, when a resistance of 820Ω was used as the resistance 59, the holding voltage $V_h$ of about 5.7 V in FIG. 8, which is common as holding voltage, was applied to the solenoid 53 and the function as a solenoid valve was surely kept. When a resistance of 1640Ω was used, voltage of 3.28 V was applied as holding voltage to the solenoid 53 and the function was just kept. When a resistance of 1690Ω was used, voltage of 3.18 V was applied as holding voltage to the solenoid 53, but the solenoid 53 could not keep the role of a solenoid valve. In addition, when a resistance of 1740Ω was used, voltage of 3.10 V was applied and the solenoid 53 could not keep the role of a solenoid valve, either.

On the contrary, in FIG. 1, a similar test was conducted using a 24V DC power source as the DC power source 5, a solenoid "STV-2-M6KG DC24V" made by TAKASAGO ELECTRIC, INC., as the solenoid 3, and a capacitor of 1000

μF as the capacitor 13. As a result, even when a resistance of 1690Ω was used, the holding voltage $V_h$ of the solenoid 3 reduces slowly to 3.18 V and the solenoid 3 kept the function of a solenoid valve. Further, even when a resistance of 1740Ω was used as the resistance 9, the holding voltage $V_h$ of the solenoid 3 reduces slowly to 3.09 V and the solenoid 3 kept the function of a solenoid valve again.

Example 2

Figure 4:
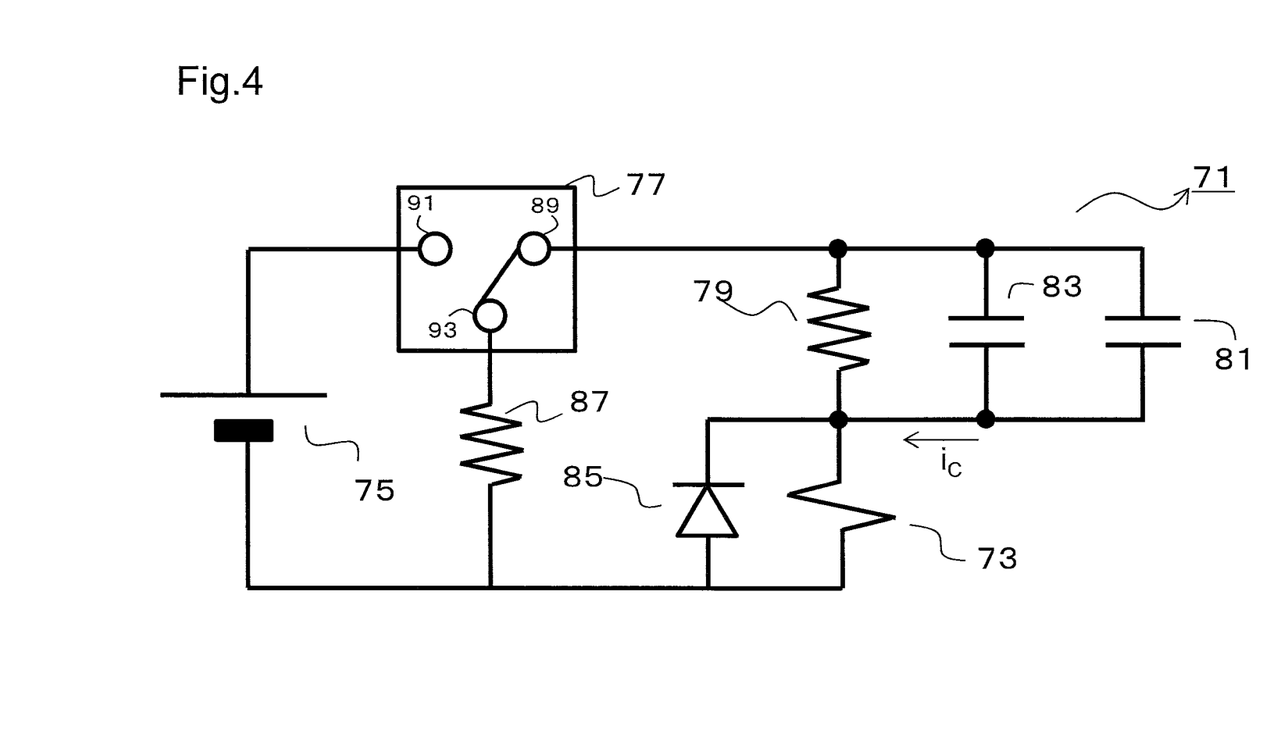
FIG. 4 shows a circuit diagram of the holding circuit in accordance with another embodiment of the present invention.
Figure 5:
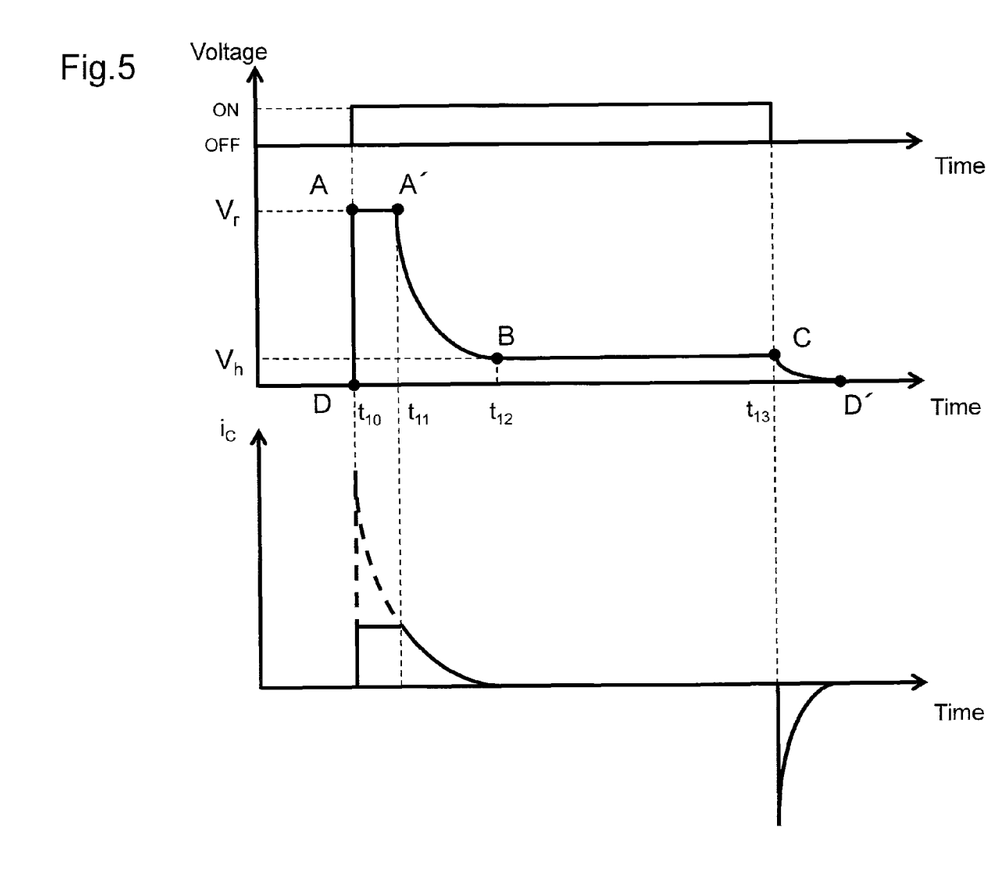
FIG. 5 shows a diagram which illustrates temporal change of voltage and current in the holding circuit of FIG. 4.

Next, referring to FIGS. 4 and 5, a holding circuit in accordance with another embodiment of the present invention is described. FIG. 4 shows a circuit diagram of the holding circuit 71 in accordance with another embodiment of the present invention. FIG. 5 shows a diagram which illustrates the temporal change of voltage and current. Below, the holding circuit 71 is explained, focusing on the difference from the holding circuit 1.

The holding circuit 71 comprises a capacitor 81 (an example of "second capacitor" in Claims) in place of the second switch 11. The capacitor 81 is different from a capacitor 83 (an example of "capacitor" in Claims) corresponding to the capacitor 11. The capacitor 81 is connected in parallel with the capacitor 83. The capacity of the capacitor 81 is larger than that of the capacitor 83.

In addition, the holding circuit 71 comprises a contactor 77 (an example of "contactor" in Claims) in place of a switch corresponding to the first switch 7. The contactor 77 has three contacts, that is, a first contact 89 (an example of "first contact" in Claims) connected to the capacitor 81, a second contact 91 (an example of "second contact" in Claims) connected to a DC power source 75 (an example of "power source" in Claims), and a third contact 93 (an example of "third contact" in Claims) connected to a solenoid 73 (an example of "solenoid" in Claims). The first contact 89, which is a common contact, is connected to the second contact 91 when the DC power source apply voltage. And the first contact 89 is connected to the third contact 93 when the DC power source does not apply voltage.

Further, the holding circuit 71 comprises a resistance 87 (an example of "discharge resistance" in Claims) between the third contact 93 and the solenoid 73. The resistance 87 is a resistance for discharging the capacitor 81 rapidly.

Next, the behavior of the holding circuit 71 is described.
<Driving Solenoid Valve>

Just after the contactor 77 connects the first contact 89 and the second contact 91 at time point $t_{10}$, rated voltage is applied to the solenoid 73 and the solenoid is driven till time point $t_{11}$ (from point A to A'). Here, it is very short period between time point $t_{10}$ and $t_{11}$. During this period, the capacitor 81 and the capacitor 83 has no resistance against current (another example of "ON state" in Claims). The sum $i_c$ of currents through the capacitor 81 and the capacitor 83 is the rated current of the solenoid 73.
<Holding Solenoid Valve>

After time point $t_{11}$, the capacitor 81 and the capacitor 83 start to be charged. Then, the capacitor 81 and the capacitor 83 works as a variable resistance against current. The voltage applied to the solenoid 73 reduces gently while back electromotive force is absorbed (from point A' to point B). After time point $t_{12}$ where the capacitor 81 and the capacitor 83 is fully charged, current does not flow at the capacitor 81 and the capacitor 83 at all (another example of "OFF state" in Claims). Here, the holding voltage $V_h$ is applied to the solenoid 73 and the solenoid 73 keeps drive state of the solenoid valve.

<Recovery and Discharge of Solenoid Valve>

At time point $t_{13}$, when the contactor 77 connects the first contact 89 and the third contact 93, a closed circuit not including the DC power source 75 and including the capacitor 81 and the solenoid 73 is formed. In this closed circuit, the solenoid 73, the capacitor 81, the first contact 89, the third contact 93 and the resistance 87 are connected in this order. Thus, the electric charge stored in the capacitor 81 and the capacitor 83 are discharged to the closed circuit. The applied voltage ($V_r$–$V_h$) to the capacitor 81 and the capacitor 83 after time point $t_{12}$ is larger enough than the holding voltage $V_h$ applied to the solenoid 73. Thus, the back electromotive force of the solenoid 73 is suppressed and the applied voltage to the solenoid 73 reduces gently and the solenoid valve recoveries to the original state (from point C to point D').

Here, if the first contact 89 and the second contact 91 is connected in order to drive the solenoid valve again before the capacitor 81 and the capacitor 83 is fully discharged, the capacitor 83 cannot play a role of the switch 11. Thus, it is important to discharge the capacitor 81 and the capacitor 83 rapidly.

Therefore, the discharge resistance 87 is placed between the third contact 93 and the solenoid 73. The resistance value of the discharge resistance 87 should be smaller than that of the resistance 79. Then, large discharge current flows in the closed circuit including the discharge resistance 87. Thus, compared with the case the capacitor 81 and the capacitor 83 are discharged only in the closed circuit including the capacitor 81 or the capacitor 83 and the resistance 79, the discharge of the electric charge stored in the capacitor 81 and the capacitor 83 are facilitated.

Here, the solenoid 73 slows down the discharge. Thus, the diode 85 connected in series to the discharge resistance 87 and in parallel with the solenoid 73 works well. The diode 85 is placed so as to let the current flow in the opposite direction of the direction to which the DC power source apply voltage, so that most of the discharge current does not flow through the solenoid 73. Thus, the diode 85 plays a more important role in the holding circuit 71 than in the holding circuit 1.

Here, the capacity of the capacitor 81 is an important value for the holding circuit 71 to function well. If the capacity is too small, the holding circuit does not work stably because the applied voltage to the solenoid becomes lower than the rated voltage before the solenoid valve is driven. On the other hand, if the capacity is too large, the heat generation of the solenoid 73 increases because the period necessary for the voltage to decrease as low as the holding voltage (from time point $t_{11}$ to time point $t_{12}$) becomes long. The applicant confirmed by experiment that the holding circuit 71 works excellently if the capacity of the capacitor 81 is three times as large as that of the capacitor 83. Here, practically, the capacitor 81 and the capacitor 83 may be realized as a single capacitor.

In addition, the applicant also confirmed by experiment that the holding circuit 71 functions extremely well if the resistance value of the discharge resistance 87 is the value such that the current which flows through the discharge resistance 87 is twice as much as the rated current of the solenoid 73 when the discharge of the capacitor begins.

As for the holding circuit 71, the timer function is realized by the capacitor 81 instead of the second switch 11, and the period from time point $t_{10}$ to time point $t_{11}$ corresponds to ON state of the second switch 11. The period after time point $t_{11}$ corresponds to OFF state of the second switch 11. As a result, the holding circuit 71 does not need a timer circuit. Therefore, it is possible to reduce the circuit size, fault probability and production cost of the holding circuit.

In the examples 1 and 2, every value of the circuit elements described above is just an example to check the holding function of holding circuits. Practically, each value may be changed according to device design.

Example 3

Figure 6:
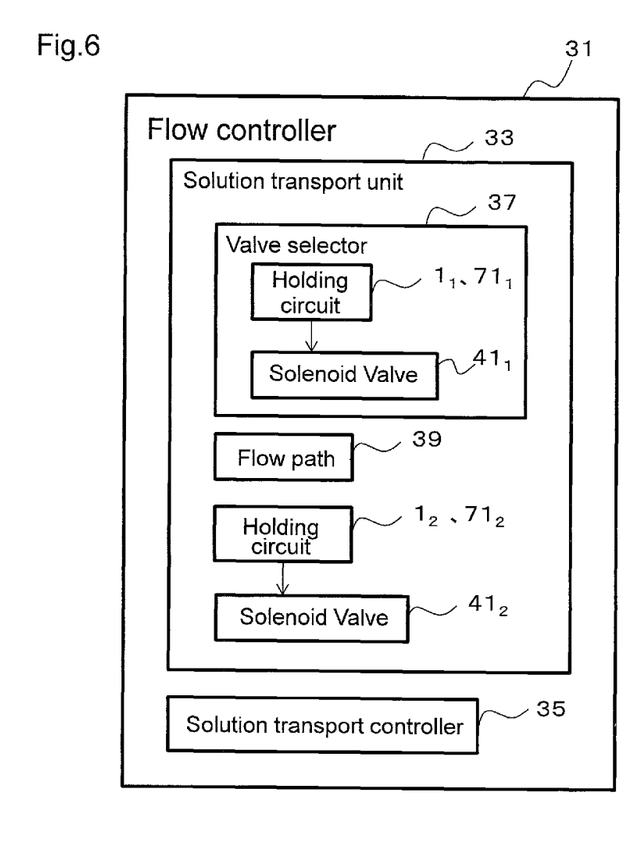
FIG. 6 shows a schematic block diagram of a flow controller with the holding circuit of FIG. 1 or FIG. 4.

Next, referring to FIG. 6, a flow controller with the holding circuit 1 in FIG. 1 or the holding circuit 71 in FIG. 4 is described. FIG. 6 shows a schematic block diagram of a flow controller 31 with the holding circuit 1 in FIG. 1.

The flow controller 31 comprises a solution transport unit 33 which transports solution and a solution transport controller 35 which controls the solution transport behavior of the solution transport unit 33. The solution transport unit 33 comprises a valve selector 37 and a flow path 39. The valve selector 37 controls the inflow into the flow path 39 and the outflow out of the flow path 39 of a plurality of solutions. The valve selector 37 comprises the holding circuit $1_1$ shown in FIG. 1 and a solenoid valve $41_1$. The holding circuit $1_1$ controls the solenoid valve $41_1$ to keep the behavior of the solenoid valve at low holding voltage. Here, the holding circuit $71_1$ may be used instead of the holding circuit $1_1$.

The solution transport unit 33 may comprise a holding circuit $1_2$ and a solenoid valve $41_2$. The holding circuit $1_2$ controls the solenoid valve $41_2$ to keep the behavior of the solenoid valve at low holding voltage. Here, the holding circuit $71_2$ may be used instead of the holding circuit $1_2$.

When utilizing a valve selector or a flow controller with a solenoid valve where heat generation is suppressed as described above, the temperature of the solenoid valve increases at most to body temperature or so even if the solenoid valve is energized all day long. Therefore, it is possible to transport solution including antibody without damage to the antibody.

REFERENCE SIGNS LIST 1 holding circuit, 3 solenoid, 5 power source, 7 first switch, 9 resistance, 11 second switch, 13 capacitor, 15 diode, 31 flow controller, 37 valve selector

The invention claimed is:

1. A holding circuit comprising a solenoid and a first resistor which are serially connected, wherein the solenoid is driven at a rated voltage and its drive state is held at a holding voltage lower than the rated voltage,
a first switching unit that is connected in series with the solenoid and the first resistor, and configured to switch between a state where the solenoid is driven and the state where the solenoid is not driven;
a second switching unit that is connected in parallel with the first resistor, and configured to switch from an ON state to an OFF state after a predetermined interval after the solenoid is driven at the rated voltage by the first switching unit; and
a first capacitor that is connected in parallel with the first resistor, and configured to have a larger time constant than that of the solenoid and to absorb back electromotive force at the solenoid by slowing down the change of voltage applied to the solenoid from the rated voltage to the holding voltage after the second switching unit is switched to the OFF state,
wherein the second switching unit is a second capacitor which is a capacitor connected in parallel with the first capacitor;
capacity of the second capacitor $C_2$ is larger than the capacity C of the first capacitor;
the first switching unit is a contactor configured to have three contacts of a first contact, a second contact and a third contact;
the first contact is connected to the second capacitor;
the second contact is connected to a power source which applies the rated voltage;
the third contact is connected to the solenoid;
the contactor is configured to start to charge the second capacitor by connecting the first contact and the second contact;
the contactor is configured to form a closed circuit including the second capacitor and the solenoid and not including the power source by connecting the first contact and the third contact; and
a discharge resistance other than the first resistor is connected between the third contact and the solenoid in the closed circuit.

2. The holding circuit of claim 1,
wherein capacity C of the first capacitor, equivalent resistance component $r_C$ of the first capacitor, equivalent resistance component $r_L$ of the solenoid, and inductance L of the solenoid satisfy a following equation (1)

[equation 1]

$$C \geq \frac{L}{r_C r_L}. \qquad (1)$$

3. The holding circuit of claim 1, further comprising a diode for letting current to flow in a direction opposite to a direction in which the power source applies voltage,
wherein the diode is connected in series with the discharge resistance and in parallel with the solenoid; and
resistance value of the discharge resistance is smaller than that of the first resistor.

4. A solenoid valve comprising the holding circuit of claim 1, wherein the solenoid valve is controlled by the holding circuit.

5. A flow controller comprising the solenoid valve of claim 4.

6. A valve selector comprising the solenoid valve of claim 4.

* * * * *